United States Patent [19]

Morohashi

[11] 4,053,225
[45] Oct. 11, 1977

[54] PORTABLE COPIER
[75] Inventor: Hisao Morohashi, Tokyo, Japan
[73] Assignee: Ohno Research & Development Laboratories Co., Yokohama, Japan
[21] Appl. No.: 676,799
[22] Filed: Apr. 14, 1976
[30] Foreign Application Priority Data

| Apr. 17, 1975 | Japan | 50-4667 |
| June 12, 1975 | Japan | 50-71247 |
| Apr. 19, 1975 | Japan | 50-53811 |

[51] Int. Cl.² .............................................. G03B 27/72
[52] U.S. Cl. ...................................... 355/115; 355/83; 355/100
[58] Field of Search ............ 355/83, 78, 100, 114–116, 355/118–121

[56] References Cited
U.S. PATENT DOCUMENTS

| 3,076,399 | 2/1963 | Limberger | 355/100 |
| 3,216,341 | 11/1965 | Burnett | 355/100 |
| 3,348,464 | 10/1967 | Sturdevant | 355/78 |
| 3,467,470 | 9/1969 | Donnelly et al. | 355/115 |
| 3,630,614 | 12/1971 | Kazle et al. | 355/115 X |
| 3,684,372 | 8/1972 | Limberger | 355/100 |
| 3,809,476 | 5/1974 | Fader | 355/115 X |

FOREIGN PATENT DOCUMENTS 732,140  6/1955  United Kingdom

Primary Examiner—R. L. Moses
Attorney, Agent, or Firm—Norbert P. Holler

[57] ABSTRACT

A contact exposure unit having a transparent contact surface and a liquid development unit having means for preventing leakage of a developer are, respectively, constructed as independent units. The exposure unit and the development unit are adapted to be releasably combined with each other thereby to form a portable copier. Outer housings of the exposure and the development units constitute in combination the housing of the portable copier.

20 Claims, 13 Drawing Figures

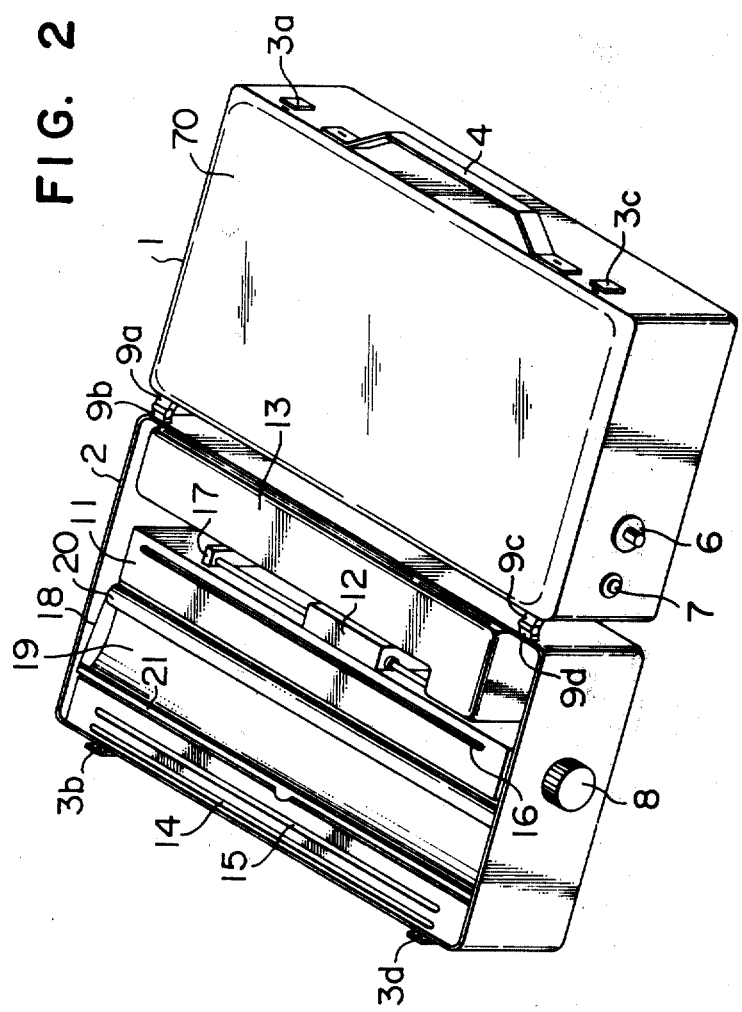

PORTABLE COPIER

BACKGROUND OF THE INVENTION

1. Field of the Invention

The present invention relates to a portable copier. More particularly, the invention concerns a portable copier which comprises an exposure unit and a liquid development unit, wherein these units can be employed independently from each other.

2. Description of the Prior Art

Copying apparatus or copier which has been hitherto generally employed comprises complicated optical systems and requires a great number of electrical mechanical and optical components for complicated processes and operations of the apparatus. For these reasons, attempts for miniaturizing and reducing the weight of the copier have encountered great difficulties. A copier of a portable type which can be readily transported or stored at a place of a narrow space has not been yet realized. On the contrary, hitherto known copying apparatus needs a special supporting structure, which not only makes the apparatus more bulky, complex and expensive, but also demands disadvantageously troublesome maintenance and repairs when it breaks down.

For duplicating a page of a book-like or sheet-like manuscript, and sheet originals, there have been developed copiers founded upon the dual spectrum process or the silver salt diffusion transfer technic. However, in the copier of these types, liquid developer is constantly exposed to air and likely to be easily oxidized. In reality, the use life of the developer employed in the above type copier is very short on the order of about one week.

In case of the copier constructed on the basis of the dual spectrum process, a heat-sensitive paper of a poor image density is used, which undesirably results in a degraded image quality of a poor contrast. Further, when the copier has been continuously operated, temperature within the apparatus is inevitably increased to bring about variations in the proper copying condition. Accordingly, the operator has to adjust frequently the operating conditions of the copier in consideration of the involved variations.

On the other hand, the copying method such as the silver salt diffusion transfer process in which the image of the original is printed on a photosensitive paper through a contact exposure has an advantage that it can produce a copy of a page of book-like manuscript or sheet-like manuscript. Besides, the copier using the above diffusion transfer process can be manufactured simply at a lower cost. It is, however, noted that the contact exposure apparatus based on the above transfer process has a drawback in that difficulty arises in accomplishing a perfect contact between the manuscript and the photosensitive paper, which in turn gives rise to a problem in obtaining a high quality copy having a high resolution power. When the copier is to be miniaturized, non-uniform distribution of illumination tends to occur on the exposure surface. Such being the circumstances, a miniaturized portable type copier has not yet been realized. It is further noted that a laboring procedure is required for the exchange of developer in the development apparatus of the above process type, and there is a danger that the developer should leak out of the development apparatus and adhere to the clothes and skin of the operator. Additionally, the development apparatus is difficult to be transported or carried. For these reason, it has been impractical to construct the copier of the above type in a portable size, and restrictions are imposed upon the copier having the exposure unit and a liquid development unit in respect of handling of photosensitive papers and the developer, locations at which the copier it to be used and operating conditions.

SUMMARY OF THE INVENTION

An object of the present invention is to provide a portable copier which can be manufactured at low costs and nevertheless can produce effectively a good quality of copies either through the reflection copying or the transmission copying.

Another object of the invention is to provide a portable copier of a miniature size which occupies little space in a stored or unused condition.

Still another object of the invention is to provide a portable copier which can be used at any desired locations or places and produce copies having an improved image quality.

Further object of the invention is to provide a portable copier which can assure a perfect contact between the manuscript and the photosensitive paper as well as an appropriate and uniform exposure illumination.

Still further object of the invention is to provide a portable copier which can be easily, safely and reliably operated even by an unskilled person.

Further object of the invention is to provide a portable copier which can be operated for producing copies without having the user touched to the developer.

Further object of the invention is to provide a portable copier which is substantially insusceptible to influences due to variations in the source voltage, temperature and moisture and therefore requires substantially no adjustment.

Another object of the invention is to provide a portable copier in which the developer will not be degraded due to oxidization even when the copier is not used for a long time.

Still further object of the invention is to provide a portable copier of a very small size and a reduced weight which has a simplified construction requiring no laborious maintenance.

Another object of the invention is to provide a portable copier which can be used by anyone at any time in any place for copying any manuscript.

With the above objects in view, there is provided according to the invention a portable copier comprising a contact exposure unit and a liquid development unit which units are adapted to be used, carried or stored independently from each other. Both of the units can be detachably connected to each other. According to another feature of the invention, the contact exposure unit has a contact surface composed of a transparent elastic member. A diffusive transparent member having non-uniform reflection characteristic is interposed between the contact surface and a light source. A light quantity control apparatus is provided to assure an appropriate exposure. A flow control apparatus is incorporated to supply therethrough a predetermined flow of the developer to a developing chamber from a developer storage container when the development is performed. After completing the developement, the developer is returned through the flow control apparatus to the storage container to be hermetically stored therein. Further, means is provided to prevent any leakage of the developer from the developing chamber when almost the entire quantity of the developer has been returned to the storage container.

BRIEF DESCRIPTION OF THE DRAWINGS

The above and other objects, novel features and excellent advantages of the invention will become more apparent by examining detailed description of preferred embodiments. The description makes reference to the accompanying drawings, in which:

FIG. 2 is an unfolded perspective view of the same.

DETAILED DESCRIPTION OF PREFERRED EMBODIMENTS

Now, the invention will be described with reference to the accompanying drawings.

Figure 1:
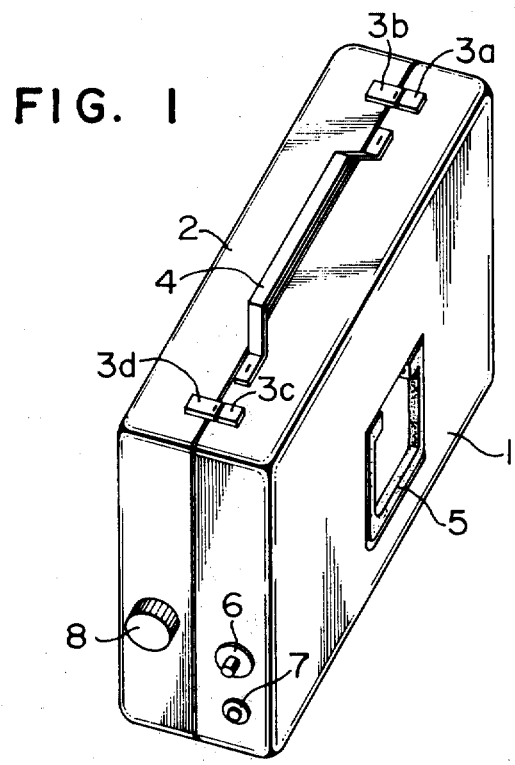
FIG. 1 is a perspective view showing a portable copier according to the invention.

In the first place, reference should be made FIGS. 1 and 2 which show a preferred embodiment of the portable type copier in a perspective view and an unfolded view, respectively. In FIG. 1, the copier is shown in a state ready for the carrying or the storage thereof. Namely, the copier can be carried by hand through a grip 4 or it can be stored in the position shown in FIG. 1 or in any other positions such as inclined or flatly laid position.

The copier comprises an exposure unit 1 of a contact copying type and a liquid development unit 2, housings of these units 1 and 2 defining in combination the outer housing of the portable copier. As can be seen from FIG. 1, the housing of the contact exposure unit 1 is provided with a manipulator handle 5 for placing a manuscript to be copied and a copying paper or photosensitive paper in close contact with each other, an adjusting knob 6 for adjustably setting the exposure value and a switch 7 for controlling the power supply to a light source. On the other hand, the housing of the development unit 2 is provided with a drive knob 8 for driving developing rolls.

Referring to FIG. 2, the contact exposure unit 1 and the liquid development unit 2 are releasably connected to each other through removable connecting members 9a : 9b and 9c : 9d. It will be noted that the exposure unit 1 and the development unit 2 can be disconnected from each other and separately carried or stored. The exposure unit 1 has an inner flat surface which constitutes a transparent contact surface 70. The liquid development unit 2 comprises a developing chamber 11, a control apparatus 12 for controlling the supply of a developer, a container 13 for accommodating therein the liquid developer and a light shield member 18. The outer structure of the developing chamber 11 is formed with an insertion opening 14 for the photosensitive paper, an inlet opening 15 for the transfer paper to which an image is to be transferred from the photosensitive paper and an exit opening 16 for the photosensitive and the transfer papers which have undergone the processings such as the development and the transfer. The control apparatus 12 comprises a lever 17 which is adapted to control the flow of developer between the developing chamber 11 and the storage container 13. It is to be noted that the storage container 13 can be removed from the liquid development unit 2 by resetting in the control apparatus 12 portion, as will be hereinafter described in more detail.

Next, the operation or procedure for obtaining a copy by using the portable copier according to the invention will be described with reference to FIG. 2.

A photosensitive paper adapted for the copying through a silver salt diffusion transfer process, such as the paper available from Mitsubishi Paper Mills Ltd. under the trade name of "HISHIRAPID N-L", for example, is laid on the transparent contact surface 70 with the photosensitive surface of the paper being positioned upwardly. Subsequently, the manuscript paper is superposed on the photosensitive paper under pressure so that the manuscript surface having images to be transferred may closely contact with the photosensitive surface of the paper. Then, the exposure adjusting knob 6 is set and the switch 7 is turned on whereby the exposure is proceeded for about 20 sec. In case that the manuscript and the photosensitive papers are superposed in the inverting order, it is possible to effect the contact transmissive copying. When the exposure has been completed, the photosensitive and the transfer papers are simultaneously inserted into the insertion openings 14 and 15, respectively, with the transfer surface of the transfer paper facing towards the photosensitive surface of the exposed paper. Thereafter, the developing rolls are rotated by the driving knob 8 and pair of both papers is exhausted from the exit opening 16. After a predetermined time duration, say 30 seconds, the development and transfer processes will be completed. When the transfer and the photosensitive papers are separated from each other, a copy of an appropriate image quality can be obtained on the transfer paper. It is to be noted that, in the course of the above process, the lever 17 is slidably moved, thereby to supply the developer to the developing chamber 11 from the storage container 13.

After completing the development, the liquid development unit 2 is lifted upwardly at the side of the photosensitive paper insertion opening 14 and the developer in the developing chamber 11 is returned to the storage container 13 through the control apparatus 12. By slidably setting the lever 17 to a corresponding position, the storage container 13 can be hermetically closed. Now, the contact exposure unit 1 and the development unit 2 are in the position to be folded to each other around the connecting members 9a ; 9b and 9c ; 9d. Such superposed units 1 and 2 are locked by means of the locking members 3a ; 3b and 3c ; 3d, whereby the portable copier is in the position for the carrying or storage as shown in FIG. 1. Since the developer is sealingly confined within the storage container 13, there is no trouble o the developer leaking out from the development unit.

In the described embodiment, the contact exposure unit and the development unit are arranged so as to be folded together to each other about the connecting members 1. However, it will be appreciated that these units may be so arranged that they can be straightforwardly superposed onto each other and held by locking means. Furthermore, in the case of the embodiment of the foldable structure, the contact exposure unit can be connected to the development unit through a flexible member such as leather or cloth strips or cord of a soft plastic material or the like. It is of course possible to construct the exposure and development units in their folded position without securing to each other.

In the case of the simply superposed structure of the portable copier, either one of the exposure unit and the development unit may be provided in a plug with the other in a socket, so that they can be fitted into each other in a telescopical manner. For securing together both units, any suitable conventional means such as elastic rubber belt of the like can be employed.

The connecting member for the exposure and the development unit is not restricted to the coupling member such as shown in FIG. 2. The securing means mentioned above in connection with the fittingly superposed structure also may be used in the foldable structure. Besides, any other suitable connecting means such as slideable joint, dovetailing joint, meshing joint or the like connector means may be employed.

For the telescopically fitting structure of the copier, the development unit may be constructed in a form of an outer box for receiving therein the contact exposure unit which is then formed in an inner box-like form of a smaller dimension than that of the development unit or vice-versa. As another telescopically fitting structure, sleeve or tube-like configuration is conceivable. In this conjunction, it is not always necessary that either one of the exposure and the development units is completely accommodated within the interior of the other. In other words, the inner unit received within the other may protrude from the latter. Furthermore, the direction in wich the one unit is received into the other may be arbitrarily selected such as in the horizontal, vertical or inclined direction, for example. It is important to note that the contact exposure unit and the development unit can perform their imposed functions independently from each other, even if these units are constructed so as to be accommodated or connected to each other in a form of a portable entity.

The contact exposure unit and the development unit may comprise, respectively, a cover and supporting legs in addition to the main body or the housing. It is besides possible to provide a gap between the units and dispose a photosensitive paper stock box, an auxiliary developer storage container, damping cushion or the like without departing from the scope and spirit of the invention. Moreover, the positional relationship between the contact exposure unit and the development unit in the folded, connected or the accommodated state is not restricted to the horizontal, vertical, inclined or the like disposition.

The external configuration of the contact exposure unit and the development unit may be of a rectangular, cylindrical, spherical, annular, rhombic, semispherical or the like configuration or combinations thereof. The copier according to the invention can be constructed in a small size and a reduced weight so that the copier can be easily carried. However, it is to be noted that the copier is not restricted to the portable type. It can be stationarily installed. The photosensitive paper also is not restricted to the aforementioned silver salt papers. Other kinds of photosensitive paper such as diazotype copying papers, blueprint papers or the like can be used. In this case, it is required that the developer has a certain proof property such as alkali proof.

Figure 3:
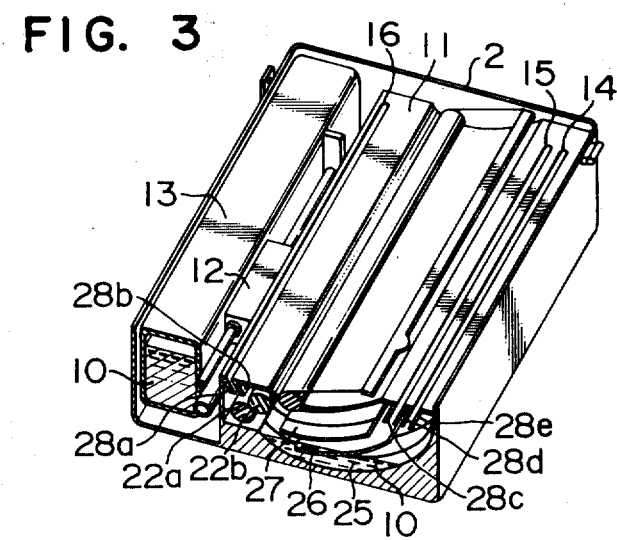
FIG. 3 is a partially sectional perspective view of a liquid development unit according to an embodiment of the invention.

Now, referring to FIG. 3 which is a sectional perspective view of a development unit to illustrate the feature of perfectly preventing the leakage of the developer from the developing chamber, the unit 2 is shown in an inclined position after completing the development, in which the insertion opening 14 for the photosensitive paper is inclined upwardly, thereby to return the developer 10 to the storage container 13 from the developing chamber 11, with the lever 17 being thereafter slidably moved to hermetically close the storage container 13. However, it is inevitable that a small amount of the developer may remain in the developing chamber 11, since the developer will adhere to the inner walls of the developing chamber 11, a pair of developing rolls 22a and 22b, a lower guide 25 for the photosensitive paper, a separation guide 26, an upper guide 27 or the like. The remaining developer is, however, adapted to be trapped by developer traps 28a, 28b, 28c, 28d and 28e so that the developer may not leak out from the developing chamber 11 even if the development unit 2 is positioned in any disposition such as inclined position. By virtue of this feature, the possibility of developer flowing out of the developing chamber can be positively prevented upon the handling of the copier at the time of carrying or storing the same.

Since the developer traps serve only to confine the small amount of remaining developer within the developing chamber so as to prevent it from flowing outwardly from the developing chamber, the trap may be of any suitable cross-sectional profile such as an inverted C-shape or L-, U- or T-like or any other convenient shape. Furthermore, arbitrarily selected number of the traps of any suitable material may be disposed at appropriate locations. In a certain case, the parts required for the proper function of the development unit may be utilized simultaneously for the traps.

In the case of the developing chamber, substantially no special restriction is imposed in respect of the shape, material and the associated elements. The developing chamber can be removably mounted in the development unit.

In any case, the term remaining developer as herein used means a small amount of the developer which remains within the developing chamber after the substantial portion of the developer used in the developing chamber has been returned to the storage container by means of the exhaust pump, cock or the like.

The development until according to the described embodiment has been assumed to have a structure which is capable of development on the basis of the silver salt diffusion technic. However, this is merely for illustrative purpose and the invention can be realized by any type structure of the development unit so far as the later exhibits the leak-proof feature for the developer when the copier is transported or handled for the storing.

Figure 4:
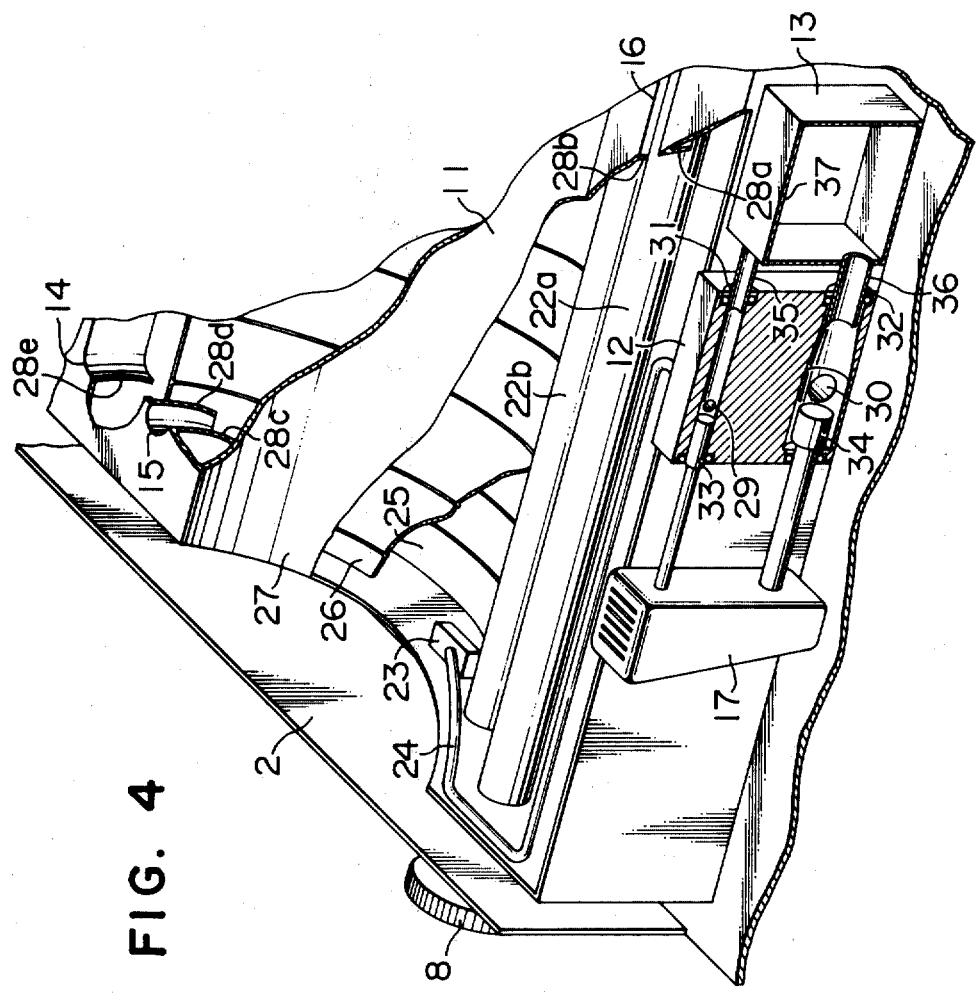
FIG. 4 is a perspective view showing a liquid development unit in detail with portions broken away.

FIG. 4 shows another embodiment of the development unit which is so constructed as to further facilitate the disposal of the developer. In the embodiment shown in this figure, the developer can be supplied to the developing chamber from the storage container by utilizing the construction described in the following. There is provided a connection box 37 for the storage container in which the developer is contained. The connection box 37 has a ventilation conduit 35 mounted at a position higher than the developer level in the container and a developer flow conduit 36 located flush with or lower than the bottom plane of the storage container. These conduits 35 and 36 are connected to a ventilation port 31 and a developer flow port 32, respectively, of the control apparatus 12. A ventilation blocking cock 33 and a developer flow blocking cock 34 are provided, respectively, to choke up a vent 29 formed in a ventilation conduit 24 communicating with an opening end 23 and a flow passage 30 for the developer, which is connected to the developing chamber 11. These cocks 33 and 34 are adapted to be actuated by the lever 17 to the position in which the vent 29 and the flow passage 30 are, respectively, connected to the ventilation conduit 35 and the developer flow conduit 36, as a result of which the developer in the storage container 13 can flow into the developing chamber 11. In this state, air is sucked from the opening end 23 into the storage container 13 through the ventilation conduit 24 to assure a smooth supply of the developer to the developing chamber 11.

When the developer is being supplied to the developing chamber 11, the flow continues until the developer head has attained the lower level of the opening end 23. As a result the suction of air therethrough is stopped, which in turn results in the interruption of the developer supply from the storage container 13. On the other hand, when the developer is consumed in the developing chamber 11, the developer level in the chamber 11 will become lower than the lower edge of the opening end 23, whereby air is sucked into the chamber 11 and the supply of the developer to the chamber 11 from the storage container 13 is automatically initiated. When the development unit is lifted up at the side of the insertion opening 14 after completing the development, the developer will flow back into the storage container 13 through the passage 30 and the flow conduit 36. During this step, air in the storage container 13 is exhausted from the opening end 23 through the conduit 35, the vent 29 and the conduit 24, whereby the possibility of the developer in the chamber 11 flowing into the ventilation conduit 24 from the opening end 23 is positively excluded. In this manner, the developer is rapidly returned to the storage container 13. Thereafter, the vent 29 and the flow passage 30 are blocked, respectively, by the associated cocks 33 and 34 through the corresponding operation of the lever 17. The storage container 13 is now hermetically closed and the developer contained in the container 13 is protected from leaking from the development unit when the latter is subjected to handling such as the transporting or the storage.

In the described embodiment, the air passage consists of the ventilation conduit 24 and vent 29. Further, the storage container 13 is adapted to be removably connected to the control apparatus 12 so as to allow a smooth flowing of the developer between the storage container 13 and the developing chamber 11. If this requirement is fulfilled, the storage container 13 may be of any suitable configuration such as a cylindrical or spherical form. When the storage container 13 is to be removably connected to the development unit, the container 13 may be preferably provided with fitting members, a handling grip, a flow sensor and the like.

As a modification of the described embodiment, the storage container 13 may be located in front or laterally of the insertion opening 14 for the photosensitive paper in place of the aforementioned arrangement, provided that the positional relation between the developing chamber 11 and the storage container is so selected that the developer stored in the container 13 can flow into the developing chamber 11 by opening the ventilation blocking cock 33 and the developer flow blocking cock 34, while upon the inclined or standing-up position of the development unit the developer may be returned from the chamber 11 to the storage container 13.

The opening end 23 may be mounted on the developing chamber 11 in a vertically adjustable manner so that the developer level within the developing chamber 11 may be desirably regulated. So far as the opening end 23 can perform the function to maintain the developer in the developing chamber 11 at a constant level and at the same time prevent the flowing of the developer into the ventilation conduit 24 upon the returning thereof to the container 13 from the chamber 11, the opening end 23 may be disposed at any suitable location in the developing chamber 11 and can be mounted even on the exterior of the chamber 11, if desired.

The control apparatus 12 is adapted to be connected to the storage container 13, developing chamber 11 and the ventilation conduit 24. When the developer is stored in the container 13 which can be sealingly closed by means of the ventilation and the developer flow cocks 33 and 34, the supply of the developer to the developing chamber 11 from the storage container 13 can be attained by correspondingly actuating cocks 33 and 34 of the control apparatus 12. It is important to note that the control apparatus assures the prevention of the developer from flowing into the vent 29 and the conduit 35. If this requirement is fulfilled, any other structure of the control apparatus can be adapted in place of the slidable cock valve arrangement described above. For example, a control structure utilizing rotation, torsion, pressure or the like may be easily conceived by those skilled in the art for selectively permitting the communication and the blockage between the storage container 13 and the developing chamber 11 and the ventilation conduit 24. In the described embodiments, materials for the various elements used in the development unit should preferably have a certain degree of chemical resistance to the developer as used.

As will be appreciated from the above description of the development unit of the copier using a developer according to one embodiment of the invention, the developer contained in the storage container which may be removably mounted in the development unit can be supplied to the developing chamber and returned to the storage container after the development in a simplified and reliable manner. For exchanging developer of various types, it is sufficient to replace the storage container filled with a desired developer without requiring any complicated procedure. Thus, the development can be effected in compliance with the intended purpose. Since the developer can be hermetically stored in the storage container, the developer will not suffer from deterioration even if the developer is left in the container for a long time. In this way, wasteful consumption of the developer can be significantly reduced as accompanied with the elimination of need for the frequent laborious exchanges of the developer.

Figure 5:
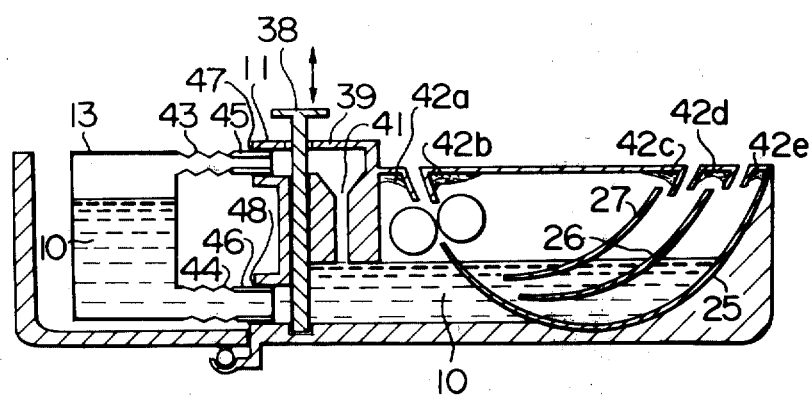
FIG. 5 is a cross sectional view of a liquid development unit.

FIG. 5 shows another exemplary embodiment of the development unit of the copier according to the invention. The development unit shown in this figure comprises a storage container 13 provided with a ventilation pipe 45 and a flow pipe 46 connected thereto through expansible tubes 43 and 44, respectively, and a control apparatus having an interruption gate member 38 for selectively establishing communication and disconnection among the storage container 13, a developer level sensor 39 and the developing chamber 11 through the vertical sliding displacement. The developing chamber 11 is provided with a developer absorbers 42a, 42b, 42c, 42d and 42e disposed along the sheet insertion and exit openings 14, 15 and 16.

The ventilation pipe 45 and the flow pipe 46 are adapted to be removably connected to a ventilation connector 47 and a developer flow connector 48. Due to the use of expansible tubes 43 and 44, the pipes 45 and 46 can be moved laterally or vertically relative to the developing chamber 11. Assuming that the storage container 13 is coupled to the ventilation connector 47 and the developer flow connector 48, and that the interruption gate 38 is slidably moved upwardly to an appropriate position, the developer will be supplied from the container 13 to the developing chamber 11. When the developer is supplied in the developing chamber 11 to attain a predetermined level, a suction and exhaust port 41 formed in the developer level sensor 39 is closed by the developer, whereby the suction of air and hence the outflow of the developer from the storage container 13 are terminated. On the other hand, when the developer in the chamber 11 is decreased due to consumption, the level of the developer in the chamber 11 is lowered, as a result of which air is permitted to enter the storage container 13, allowing the supply of the developer 10 to the developing chamber 11 from the storage container. After the completion of development, the developer in the chamber 11 can be returned to the storage container 13 by lifting up the developing chamber at a right end portion as viewed in FIG. 5. Air confined in the storage container 13 can escape from the port 41 which is now communicated to the atmosphere, whereby the smooth flow of the developer into the container 13 can be assured. After the developer has been returned to the storage container, the interruption gate member 38 is slidably moved downwardly. The developer collected in the container 13 is thus positively hermetically confined therein.

A small amount of the developer may remain in the developing chamber 11 even after the developer has been returned to the storage container 13. Such remnant developer will tend to flow along the walls in the developing chamber toward a lower level portion in dependence upon the positions taken by the development unit and finally be absorbed by some ones or all of the absorbers 42a, 42b, 42c, 42d and 42e formed of a sponge or the like material. In this way, the developer is reliably prevented from flowing outwardly of the developing chamber 11.

It will be understood that the amount of remnant developer can be substantially reduced by coating the inner walls of the developing chamber as well as the elements contained therein with a hydrophobic material to the developer such as silicone resin, fluorocarbon polymer, polyethylene or the like.

In the just above described embodiment, the storage container 13 may be formed integrally with tubes 43 and 44, the ventilation pipe 45 and the developer flow pipe 46 through a blow molding technic. These configurations as well as the dimensions of the storage container 13 and materials described above are so selected that the storage container 13 as connected to the control apparatus can be moved laterally and vertically relative to the developing chamber 11 while assuring selectively desired flow coupling between the container 13 and the chamber 11 through appropriate control operations. When the control apparatus 12 is of such a structure that no developer may leak out from the apparatus 12 due to the slidable operation of the interruption gate member 38 and additionally the developer in the container 13 is positively prevented from flowing into the developer level sensor 39 and the developing chamber 11, the control apparatus 12 may be disposed independently or separately from the developer level sensor 39. The main function of the developer level sensor 39 resides in the maintenance of the developer level in the developing chamber 11 at a predetermined constant level. In the described embodiment, this function is accomplished by the lower end in the level sensor 39. Depending on the variation in the developer level in the developing chamber 11, the suction and exhaust port 41 is opened or closed by the developer. However, it will be appreciated that the invention is not restricted to such arrangement of the developer level sensor. Other structures thereof may be employed for performing the above function without departing from the teaching of the invention. Besides, the mounting location of the sensor relative to the developing chamber 11 is not bound to the illustrated one.

For the material of the absobers 42a, 42b, 42c, 42d and 42e, other materials than the sponge, for example, cloth, paper or activated charcoal, silica-gel preferably held in a net or a perforated box or any other materials which have absorbing property to the developer may be used singly or in combinations.

In the described embodiment, it is not restricted that materials such as the lower guide 25, separation guide 26 are also made hydrophobic in addition to the inner wall of the developing chamber 11.

The developer flow connector and the ventilation connector in the storage container 13 may be made of an unit, if the provision is made such that the developer and air may flow through the single connector separately from each other when the storage container is communicated through the control apparatus to the developer level sensor and the developing chamber. The connection to the control apparatus may be realized through any conventional means such as thread connection, press fitting or the like. The material and the configuration of the storage container may be arbitrarily selected. This container may be provided with an openable inner cover for the developer flow connector, a fitting for securing to the development unit, a grip and opening for charging the developer into the container, if desired.

For the control apparatus used in the described embodiment, any suitable means which can selectively establish and interrupt the connection between the developing chamber and the developer level sensor may be employed. To this end, a rotatable valve, a cock, a disk formed with apertures, slidable gate member or the like control mechanism may be exemplarily enumerated.

By applying hydrophobic treatment to inner walls of the developing chamber as well as materials disposed therein, the amount of remnant developer in the developing chamber after the evacuation thereof can be remarkably reduced. This feature brings about such advantage that the copier can be freely and easily carried or stored in any positions without restriction imposed on the storing place, since the possibility of the developer leaking outwardly is positively excluded.

Furthermore, in the described embodiment of the development unit, the supply to the developing chamber can be carried out with a facilitated manipulation. Besides, the developer in the developing chamber can be collected into the storage container by simply moving the latter with the developing chamber held stationary. Thus, there arises no trouble that the leaking developer should impair the clothes and skin of the operator when the developer is returned to the storage container.

Figure 6:
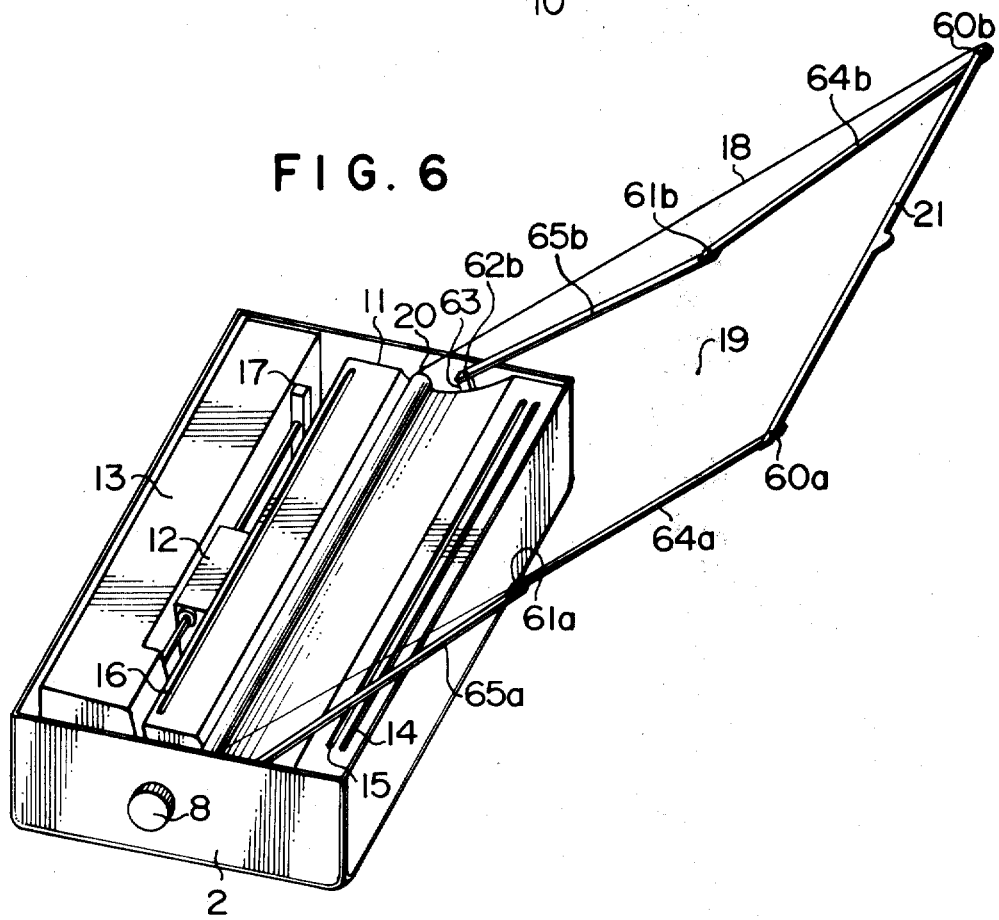
FIG. 6 is a perspective view of a liquid development unit with a light shield member in an extended position.

FIG. 6 shows another embodiment of the development unit having an extensible light shield member. As can be seen from this figure, the light shield member comprises a take-up roll 20, pivots 60a, 60b, 61a, 61b and 62b, movable arms 64a, 64b, 65a and 65b, a holding member 63, a holding bar 21 and a shield film 19 to cut off the light in the wavelength to which the photosensitive paper has sensitivity. The light shield film 19 is secured to the holding bar 21 and the take-up roll 20 at both ends. When the holding bar 21 is slightly pressed toward the take-up roll 20, movable arms 64a, 64b, 65a and 65b are folded around respective pivots whereby the film 19 is relaxes from the tensioned state and readily wound up by the take-up roll 20. These individual elements constituting the shield member 18 are arranged to be easily accommodated within the development unit 2. Upon usage, the shield member 18 can be made easily to the extended state shown in FIG. 6 by merely pulling out with aid of the holding bar 21. Of course, the shield member can be set to a partially extended position in place of the fully extended position.

By using the development unit 2 having the above described light shield member 18 in a relatively bright environment (above 3000 Lux), development was carried out for an exposed photosensitive paper ("HI-SHIRAPID" manufactured by Mitsubishi Paper Mills Ltd) on the basis of the copying technic in accordance with the silver salt transfer principle. The photosensitive paper which had undergone the exposure was extracted from the exposure unit 2 to a location below the light shield film 19 which is colored in red to prevent the sensitization of the exposed paper. Subsequently, a transfer paper ("HISHIRAPID-P" manufactured by Mitsubishi Paper Mills Ltd) was superposed onto the exposed photosensitive paper in a proper alignment with the photosensitive surface of the latter facing the transfer surface of the transfer paper under observation from above through the shield film 19. These papers were then inserted into respective openings 14 and 15. Therefore a copy having a image of high contrast could be obtained. On the other hand, when similar development was carried out for a manuscript having a high contrast between the image and the background under the similar ambient light condition by using the development unit having no light shield such as the film 19 or having the shield film but retracted into the accommodated position within the development unit, a poor copy on which it is difficult to discriminate the copy image of the manuscript was obtained. Further, when news paper having a lower contrast or a colored original was copied without using the light shield member 18, the image quality or contrast of the obtained copy was remarkably degraded to make the discrimination utterly difficult.

In the above embodiment of the development unit, the take-up roll 20 may be composed of a solid cylinder, a hollow cylinder, or may be of a rectangular, triangular or the like cross-section. The material for the take-up roll as well as the mounting location may be suitably selected. Furthermore, the take-up roll may be provided with a spiral or coil spring to facilitate the take-up operation of the shield film 19. Movable arms 64a, 64b and 65a, 65b, pivots 60a, 60b, 61a, 61b and 62b, holding bar 21 and the shield film 19 copperate to constitute the extensible light shield member 18. Materials, configurations as well as positional relations of these elements may be conveniently selected so that the intended function described above may be accomplished. In this sense, the invention is not restricted to the illustrated embodiment. In the case of the copying in accordance with silver salt transfer technic, the photosensitive paper and the transfer paper undergoing the development process can not be separated from each other until the transfer has been done. Accordingly, the light shield member may be provided also in the vicinity of the exit opening 16 of the photosensitive and the transfer papers, with a view to preventing the deterioration in the produced image quality due to the ambient light.

In the above embodiment, the light shield film 19 has been described as colored in red so as to cut off only the light in the wavelength range to which the photosensitive paper can be sensitized. However, it is possible to use such material for the shield film 19 which is non-transparent to all the wavelength light. Of course, a material exhibiting some transparent to the ambient light may also be used for the shield film, so far as no adverse influence is exerted on the development. As a typical material for the film 19, a plastic film may be conceived. However, other materials such as cloth, paper or the like having a desired flexibility can be equally used. The light shield member 18 can be so arranged that it simultaneously serves as guides for insertion openings 14 and 15. It is herein emphasized that the light shield member 18 has preferably to be extensible and retractable so as to be accommodated within the housing of the development unit. So far as such requirement is fulfilled, the body or a portion of the housing may be utilized as the light shielding means to the same effect.

The term "shielding" as herein used means that the light of the wavelength to which the photosensitive paper senses is cut off, while the light in the other wavelength range is transmitted or alternatively cut off. For the accommodation of the light shield member, it is not necessarily required that the member can be utterly confined within the housing. It may partially protrude exteriorly from the housing.

The development unit according to the above described embodiment of the invention can be utilized in a bright environment such as a room abundant with sun light or even out-of-door without incurring deterioration in the image quality of the produced copy, since the adverse influence of ambient illumination can be effectively suppressed until copy process has been completed. Even when a paper having a high photosensitivity is used, no restriction is imposed on the location where the development is to be carried out. In other words, need for a special copy room or dark room is eliminated. This feature also contributes to the enhancement in the yield of the produced copy and hence a significant reduction in the copying cost.

By using a material which can cut off only the light of the wavelength to which the copying paper is sensitive for the light shield film 19 which can be contained compactly within the housing of the development unit and extended to a desired extent upon use, the manipulation of the photosensitive paper and the transfer paper is facilitated, since such manipulation can be conducted under the visual observation through the semi-transparent light shield film 19.

Figure 7:
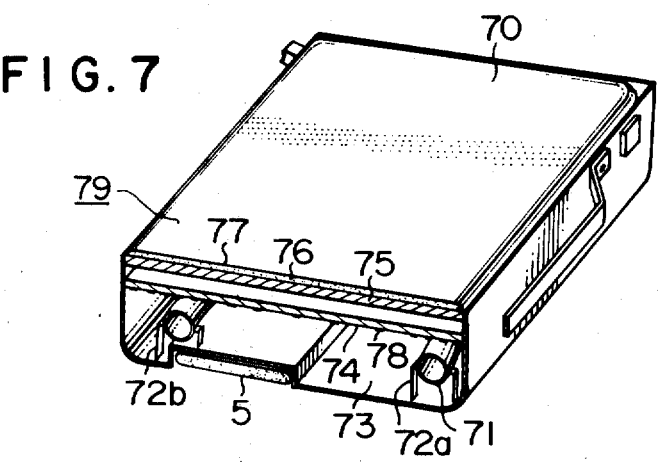
FIG. 7 is a partially sectional perspective view of a contact exposure unit according to the invention.

FIG. 7 is a partially broken perspective view of the contact exposure unit according to an embodiment of the invention. This exposure unit is composed of a body 73, a circular fluorescent lamp 71, a transparent member 74, a diffusive transparent member 75 and a transparent contact surface 70. The inner surface of the body 73 is coated with a reflective material of light in white such as magnesium oxide, titanium dioxide or the like pulverized materials. The fluorescent lamp 71 is adapted to be mounted on the body 73 by means of holder 72a, 72b. The light transparent member 74 is composed of a transparent plate which is provided with reflection media 78 formed in a net or matrix point pattern of a material such as magnesium oxide, titanium oxide, zinc oxide, cerium oxide or the like substance. The application of the media 78 are made in such a manner that the media have a maximum density in the location adjacent to the fluorescent lamp and the density is decreased as remoted from the lamp. As a consequence, the light flux reflected from the reflection media 78 will be proportional to the density of matrix points, whereby the light impinging onto the reflection media 78 at the area located immediately above the fluorescent lamp is scattered. In such a manner, a uniform illumination over the diffusive transparent member 75 may be obtainable.

The contact exposure surface 70 is the outer surface of a transparent plate composed of an elastic member 76 of white sponge material and a protection member 77 of embossed polyethylene sheet material.

As a numerical example in designing the exposure unit shown in FIG. 7, the distance between the inner face of the body 73 and the lower surface of the diffusive transparent member 75 is 5 cm with the interior width of 23 cm. A circular fluorescent lamp rated 15 W which is commercially available is employed as the light source. Measurements of illumination distribution below the transparent member 74 in the above embodiment have shown that unevenness in the illumination occurs to such degree that the brightest portion has an intensity about several ten times as high as that of the dark portion when the transparent member 74 is not employed. In contrast thereto, when the transparent member 74 is used, the unevenness in the illumination distribution can be suppressed to a tolerable range in the order of ± 5%. This can be explained by the fact that the light having a high intensity is scattered to otherwise dark area due to the action of the transparent member 74 thereby to produce a substantially uniform illumination.

The embossed protection member 77 constituting the transparent elastic member 79 serves to prevent unwanted slip of the photosensitive paper disposed thereon by virtue of the frictional engagement. To this end, the member 77 may be formed with grooves in a grating pattern or crossed triangular pattern or merely be roughened. Such slip preventing feature of the member 77 will allow a facilitated disposition, alignment and the removal of the photosensitive paper relative the contact exposure surface.

The transparent member 74 may be alternatively formed of a developed photographic plate having non-uniform transparency to serve as a light absorbing means. In this case, although there arises some loss in the light flux due to the absorption, a substantially uniform illumination distribution can be attained as in the case of the reflection member having non-uniform reflection characteristic. Of course, both of the light absorption member and the light reflection member may be used in combination, if desired.

In the contact reflection process utilizing the exposure unit shown in FIG. 7, a photosensitive paper such as "HISHIRAPID" as hereinbefore described is placed in a predetermined position on the protection member 77 and then a manuscript sheet is disposed over the photosensitive paper. The paper and sheet are then subjected to the exposure under a pressure applied thereto by a suitable flat plate in order to maintain the aligned superposition. The disposition of the photosensitive paper at a predetermined location as well as removal thereof after the exposure can be easily carried out by virtue of the slip preventing function of the member 77. In case of the contact transmission copying, the superposed relative position of the photosensitive paper and the manuscript are reversed. In such case, the positioning as well as removal of the original is facilitated. A copy has a sharp image having no blurs after the development.

In an exemplary experiment, the transparent elastic member 79 was removed from the exposure unit shown in FIG. 7 and a photosensitive paper of a large size such as 297 × 210 mm was disposed on the diffusive transparent member 75. A manuscript having distortions such as a wavy profile was placed on the photosensitive paper. The exposure was effected with a flat weight of 3 kg positioned on the manuscript. The developed image seriously suffered from blurs to such degree that the discrimination of copy image was substantially impossible. In contrast thereto, when the contact exposure was done by using the diffusive transparent member 75 or a similar original having wavy unevenness, a clear copy having no blurs could be obtained after the transfer and development treatment.

The transparency distribution of the transparent member 74 should be suitably determined in consideration of the light source, the location thereof, the reflection characteristic of the inner surface of the body 73 or the like parameters. In general, the transparency of the member 74 should be selected small in the vicinity of the light source and increased as the distance from the light source is increased. The transparency of the member 74 is not necessarily normal but may be a diffused transparency characteristic. In the latter case, the members 74 and 75 of the exposure unit shown in FIG. 7 may be formed as an integral member. When the member 74 is to be provided with a non-uniform reflection characteristic, the reflection may be either normal or a diffused reflection. For the fabrication of the member 74, a photographic plate or film may be disposed at the location of the member 74 and printing treatment is effected. Thereafter, a white ink may be printed on the transparent plate through a half-tone process by dots of various sizes. Alternatively, a transparent plate provided with metal layer through evaporation and coated with a photopolymer material is located in place of the member 74. Thereafter, a contact screen is superposed on the plate and, after printing, the non-hardened photopolymer portion is eliminated. Thereafter, the exposed metal is etched away thereby to produce the transparent member 74. Of course, any other suitable processes may be employed for the fabrication of the member 74.

The interior of the body may be made with a mirror reflection layer as metallic surface in place of the white layer. Since the light in the above embodiment is to be of the wavelength to which the photosensitive paper can be sensitized, these transparent members 74, 75, 76 and 77 may be so constructed as to selectively transmit the above wavelength light.

Any convenient means may be employed for fixedly supporting the diffusive transparent member, reflection plate, light source of the like elements.

As hereinbefore described, an important function of the reflection plate having non-uniform reflection characteristic is on one hand to increase the reflection at the bright portion and, on the other hand, to decrease the reflection at portions of a poor illumination, thereby uniforming the distribution of light flux. Thus, the otherwise dark portion is also brightly illuminated. Another advantage of the reflection plate can be seen in the fact that the reflection plate may be regarded as a planar light source having an even distribution of illumination. As a result, no appreciable unevenness in the exposure illumination over the contact surface will occur regardless of distances from the reflection plate to the diffusive transparent member and the contact surface. In this way, when the improved reflection plate is used, an uniform illumination on the contact surface can be maintained even if the distance between the surface and the light source is varied by employing an interposed spacer or a transparent member on the diffused transparent plate. In a hitherto known exposure apparatus in which a number of light sources are used, reflection factors of the manuscript and the photosensitive paper provide influential parameters. In contrast thereto, the influence of the reflection factor of the manuscript can be advantageously suppressed due to the use of the reflection plate and the diffusive transparent member according to the invention.

As will be understood from the above description, an exposure unit of a small size and a reduced weight which scarcely produces unevenness in the exposure illumination has been provided according to the invention. Furthermore, by virtue of the provision of an elastic member, a close contact between the manuscript and the photosensitive paper can be attained, whereby the resolution power is also enhanced.

Figure 8:
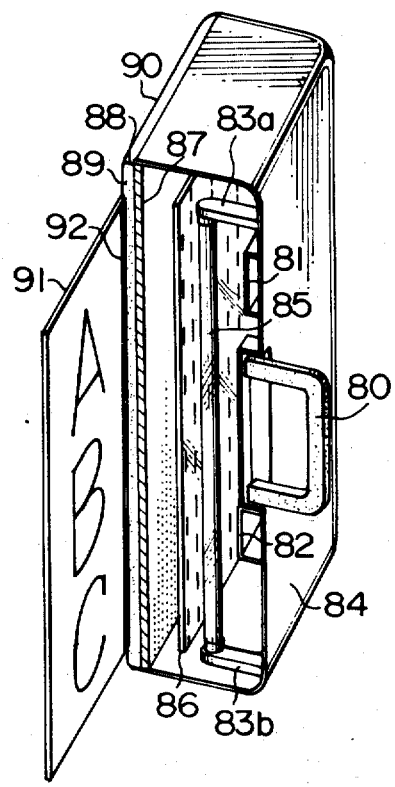
FIG. 8 shows in a partially sectional perspective view a contact exposure unit in a position for copying a wall portion of a building.

FIG. 8 shows another embodiment of a contact exposure unit according to the invention which is adapted to copy a manuscript constituted by a wall surface portion of a building.

The exposure unit shown in FIG. 8 is composed of a press handle 80, a choke-coil box 81, a control box 82 of exposure value, a straight fluorescent lamp 85 supported on a body 84 through fixtures 83a and 83b, a reflection plate 86 having a non-uniform reflection characteristic, a diffusive transparent plate 87 and a contact exposure surface constituted by a transparent elastic member 90 which in turn comprises a protection film 88 containing an ultraviolet ray absorbent and an elastic member 89 of a white sponge material. In the process of exposure, a photosensitive paper 92 is at first applied onto the manuscript 91 constituted by a wall portion of a building (hereinafter referred to as wall manuscript). Thereafter, the exposure unit held by hand through the press hold 80 is pressed against the photosensitive paper 92 and the straight fluorescent lamp 85 is turned on. After the completion of the exposure, the photosensitive paper 92 is subjected to the development and transfer treatment. It has been found that a clear copy of a high image quality of the manuscript 91 can be obtained without accompanied with any blurs due to possible gaps between the manuscript 91 and the photosensitive paper 92.

In the above embodiment, the hold mounted on the housing of the exposure unit is so designed that a force can be conveniently applied to exert pressure uniformly on the manuscript. A desired number of such holds may be provided at suitable location. It is, however, preferred that holds are so mounted that they do not protrude excessively from the housing wall. The construction as well as configuration of the hold is never restricted to the illustrated ones. So far as the main function of the hold to press the exposure unit against the photosensitive paper and the manuscript is assured, the hold may be constructed in any suitable manner. For example, a mechanism allowing the hold to be set to a position for use and retracted to a folded position in the stored state of the copier may be incorporated in the exposure unit in combination with the development unit.

Although a straight fluorescent lamp is employed in the illustrated embodiment, other variety of light sources such as a circular or U-like fluorescent lamp, a conventional bulb, strobo-lamp, flash lamp, EL or the like may be employed in a desired number.

For imparting the non-uniform reflection characteristic to the reflection plate of the illustrated embodiment, it is conceivable to coat a transparent plate with a uniform reflection layer, after which the reflection material is removed in a dot or line pattern so as to exhibit the non-uniform reflection characteristic. Alternatively, such characteristic may be straight forwardly obtained through well known evaporation, printing or coating technics. An etching process utilizing a photoresist may be utilized for the same purpose.

The diffused transparent plate of the illustrated embodiment serves to produce a uniform illumination distribution over the contact surface. This plate may be omitted, if desired, by selecting suitable the location of the light source or using another reflection material or filter or the like.

The protection film 88 used in the illustrated embodiment of the exposure unit is dyed with a fluorescent dye serving as the ultraviolet ray absorbent. To this end, the protection film was immersed in aqueous solution of a fluorescent dye available in the name "Whitex ERN" from Sumitomo Chemical Co., Ltd., Japan for 8 hours at 50° C. Thereafter, the dye impregnated film was rinsed with water and dried. The protection film thus prepared has been left at a room temperature about one month. The exposure surface has been finished by covering the elastic member with the treated protection film. The finished assembly was used as the exposure surface and the measurement of available quantity of light was conducted by using a particular light source. It has been found that the light quantity on the exposure surface is reduced about 10% over the whole range of visible wavelength in the case of the protection film which has not been treated in the above described manner.

The ultraviolet ray absorber is not restricted to the fluorescent dye. For example, a yellow dye capable of transmitting therethrough the light of wavelength to which the photosensitive paper can respond may be used. In practice, any dye materials which can absorb ultraviolet ray to protect the elastic member from deterioration can be employed, so far as the protection film can be impregnated with such dyes.

In place of directly dyeing the protection film, a mixture of dye and polyethylene powder or polyvinylalcohol may be applied to the protection film.

White sponge material for the elastic member 89 in the above embodiment should have a uniform transparency for the light of wavelength to which the photosensitive paper can respond. If this requirement is fulfilled and a certain elasticity is available, the substance, color, porosity and configuration of the sponge material will provide no essential factors to be considered. Furthermore, the elastic member may consist of other materials than the white sponge such as homogeneous cotton wool, transparent soft rubber formed with numerous projections and fluffed cloth, for example. With a view to preventing the deterioration due to ultraviolet ray, the elastic member may be directly impregnated with dye or alternatively applied with a solution containing such dye material.

In brief, the transparent elastic member of the illustrated embodiment may be made of any material which can transmit therethrough at least a portion of light having wavelength to which the photosensitive material can respond and exhibit a sufficient degree of elasticity to allow the elastic member to become flat for assuring an adequate close contact with the manuscript and the photosensitive paper in the exposure process. In addition to the above enumerated material such as sponge, etc., cotton air bag, air cushion, glass wool cloth or the like may be used for the elastic member. Besides, a plurality of transparent coil springs arrayed on a transparent plastic plate or a transparent soft rubber disposed on a transparent plastic plate may be used singly or in combination. The elastic member may be reinforced by a rigid material.

In an example of the invention, a protection film of the illustrated embodiment has been fabricated from a commercially available transparent polyethylene film in thickness of 0.09 mm which was dyed with a fluorescent dye (Whitex NKR manufactured by Sumitomo Chemical Co., Ltd.) through immersion for 24 hours at 50° C.

Deterioration as well as natural oxidation in air of the white sponge available under the trade name of "ESS" from Hamapren Co., Ltd., Japan, which has been used for the elastic member in an example of the invention were tested in the following manner. As the specimens to be tested, white sponge sealed by dyed polyethylene film (sample A) white sponge sealed by undyed polyethylene (sample B) and unsealed white sponge (sample C) are prepared. These samples A, B and C have been left at a room where usual ambient illumination prevails and a dark room, respectively, for 4 months and tested, to obtain results. Such results are listed in the Table I. Additionally, the old samples A, B and C which have been left as described above as well as fresh samples A, B and C were used for the elastic member of the exposure unit shown in FIG. 8 and the contact exposure were conducted on a photosensitive paper (HI-SHIRAPID N-L) through the silver salt diffusion process. When the reflection density of produced images were comparatively measured by a densitometer (TYPE P-2 manufactured by Fuji Photo Film Co., Ltd., Japan), results were obtained as shown in Table II.

Table I

| Places | Samples A | B | C |
|---|---|---|---|
| Common room | No change | Slightly yellowed | Blown |
| Dark room | No change | No change | Slightly yellowed |

Table II

| Samples | A | B | C |
|---|---|---|---|
| Old | 0.38 | 0.38 | 0.18 |
| Fresh | 0.38 | 0.6 | 1.1 |

The press hold provided in the exposure unit shown in FIG. 8 improves the operation of the unit. This is a great advantage over the conventional copier which is usually required to be installed stationally at a predetermined location. According to the invention, the copying operation may be conducted at any place. Further, a great variety of manuscript of various size can be easily copied by the copier according to the invention. The press hold may be folded within a concaved recess formed in the outer housing of the exposure unit when the latter is not used.

Since the light transparent elastic member of the exposure unit according to the illustrated embodiment is composed of the protection film and elastic member as described hereinbefore, oxidization of the elastic member due to oxygen in air can be positively prevented by making the protection film air-tight. The dyed protection film capable of absorbing ultraviolet ray can protect the elastic member from being deteriorated in respect of the transparency and the elasticity by the action of light. This feature may be further improved by depositing the ultraviolet ray absorber on the elastic member itself. It is thus possible to accomplish a stabilized contact copying with a high uniform exposure illumination. By virtue of the above structure of the contact exposure surface of the exposure unit, the copier is substantially immune to aged deterioration and can retain its highly improved performance for a long period.

Figure 9:
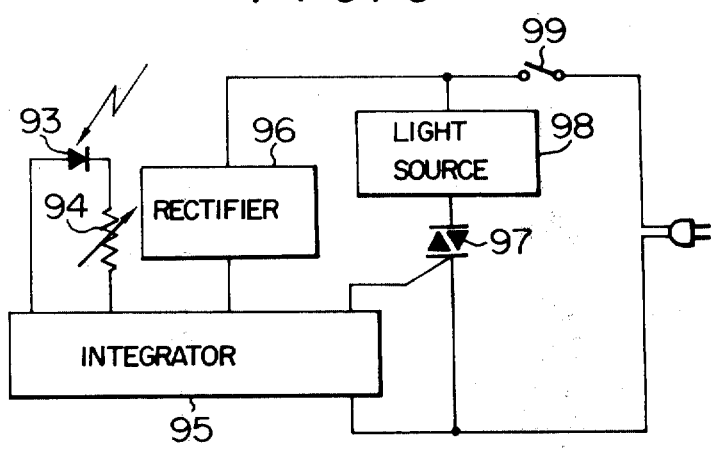
FIG. 9 is a circuit diagram of a light quantity control circuit incorporated in the exposure unit.

FIG. 9 shows an example of a control circuit of light which can be incorporated in the exposure unit according to the invention. The control circuit is composed of a photosensor 93, a variable resistor 94 for adjusting the sensitivity of the circuit, an integrator 95, a rectifier circuit 96, a triac 97, a light source 98 and a switch 99. When the photosensor 93 is illuminated, the integrator 95 operates to integrate the quantity of light impinging onto the photo-sensor 93 and switches the triac 97 in the nonconductive state at a predetermined light quantity level required for the contact exposure. When the triac is turned off, the supply of electric energy to the light source 98 is interrupted. The required quantity of light may be varied by correspondingly adjusting the variable resistor 94. Since the light radiation from the light source is susceptible to changes due to variations in the source voltage, frequency thereof, temperature and the raising characteristic, it is desirable to design the integrator such that the above adverse influences may be compensated. The integrator may be either of analogue or digital type. The photo-sensor or detector may be composed of a photocell, phototransistor, photodiode, photoconductor or the like element. The triac may be replaced by a relay. Any type of light sources can be employed. When a light source such as strobo lamp adapted for producing radiation of a relatively short duration is employed, the control circuit should be designed to have a rapid response. On the other hand, when a light source of a reduced intensity is used, means should be provided to suppress the drift of circuit at a minimum value. By utilizing the light quantity integrating circuit, it is possible to protect the light source from undesirable influences as caused by variations in the source voltage, frequency, temperature, moisture, initial characteristics of the intensity after the energization of the light source or the like, whereby uniform copies can be always produced without requiring skill for the operator.

Figure 10:
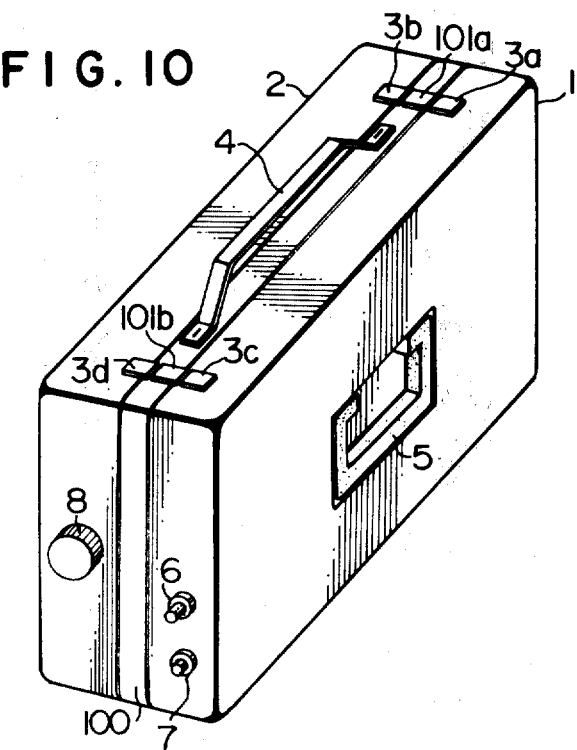
FIG. 10 is a perspective view showing a copier having a stock box for photosensitive papers disposed between an exposure unit and a development unit.
Figure 11:
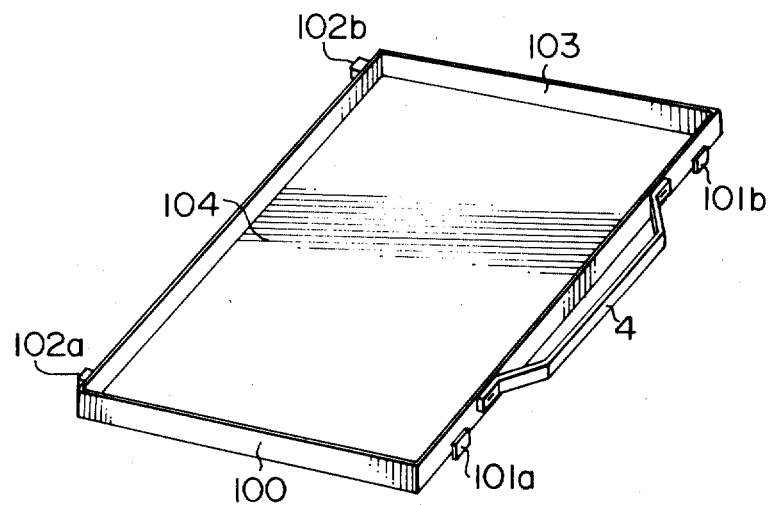
FIG. 11 is a perspective view showing another embodiment of the stock box for the photosensitive papers.

FIG. 10 shows in a perspective view an embodiment of the copier according to the invention in which a stock box for photosensitive papers is interposed between the contact exposure unit and the liquid developement unit. FIG. 11 is a perspective view of the stock box for the photosensitive paper. The stock box 100 is releasably connected to the exposure unit 1 and the development unit 2 by means of lock 101a; 101b and connecting members 102a; 102b. The grip 4 shown in FIG. 1 is mounted on the stock box 100. The stock box 100 comprises an enclosure frame 103 and a bottom plate 104 defining a stock chamber in which the photosensitive papers and the transfer papers, if necessary, are stored. In the case where the contact surface of the exposure unit 1 is formed of the elastic member, the possible permanent deformation thereof likely to occur during the transporting or storage of the copier can be prevented by the stock box. The bottom plate 104 may be provided with a means for inhibiting the leakage of developer. To this end, the bottom plate may be so arranged that it can positively cover the insertion and exit openings for the photosensitive and the transfer papers (FIG. 2). In other word, the bottom plate 104 serves also as the cover for preventing the leakage of the developer. Trap members as well as absorber means may be advantageously provided on the bottom plate to the same effect. In addition to the above desirable effects, the stock box 100 provides its inherent advantage that the photosensitive papers and (or) transfer papers are not required to be carried separately from the copier. Obviously, the stock box 100 may be disposed at an outer side of the exposure unit or development unit in place of the location shown in FIG. 10. Since the stock box forms a part of the outer housing of the copier, the box can be formed of any suitable material in any desired configurations of a given size and colored in a desired manner. It is not necessarily required to provide the box with the grip, latches and coupling members. Furthermore, accompanying effects of the stock box such as the prevention of developer leakage may be accomplished by additional means.

Figure 12:
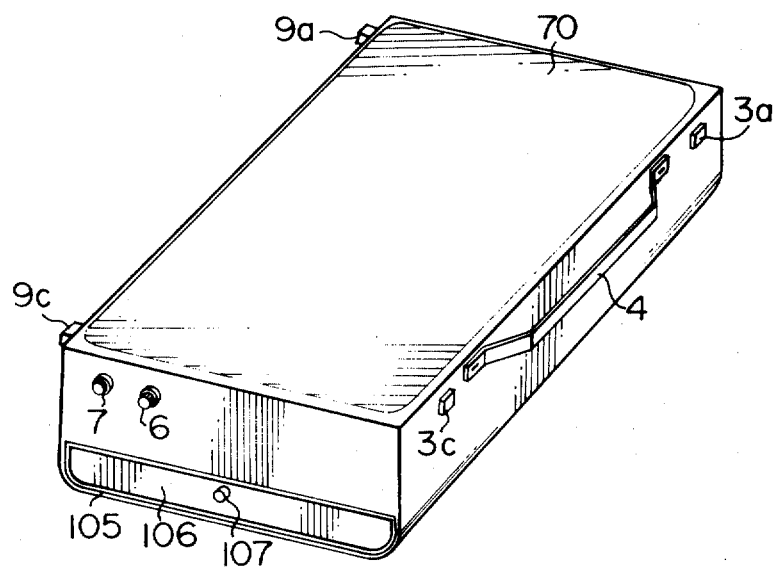
FIG. 12 is a perspective view of an exposure unit having a photosensitive paper stock chamber defined therein.

FIG. 12 shows in a perspective view an embodiment of the exposure unit provided with the stock portion for the photosensitive paper. The exposure unit of the substantially same construction as the one shown in FIG. 1 is additionally formed with an opening 105 for stock chamber of the photosensitive paper, a cover plate 106 and a knob 107. It will be appreciated that the inner stock chamber is provided at the lower portion of the exposure unit. The stock portion may be formed integrally with the exposure unit or independently therefrom. In the latter case, the stock portion may be detachably secured to the exposure unit. The stock chamber of this kind is intended to be encompassed by the term "stock box" as used herein. The portable copier shown in FIG. 12 is composed of two separatable portions which much facilitates the manipulation to open the apparatus for use or to close for the storage or the carrying, as compared with three-part apparatus shown in FIG. 10.

Figure 13:
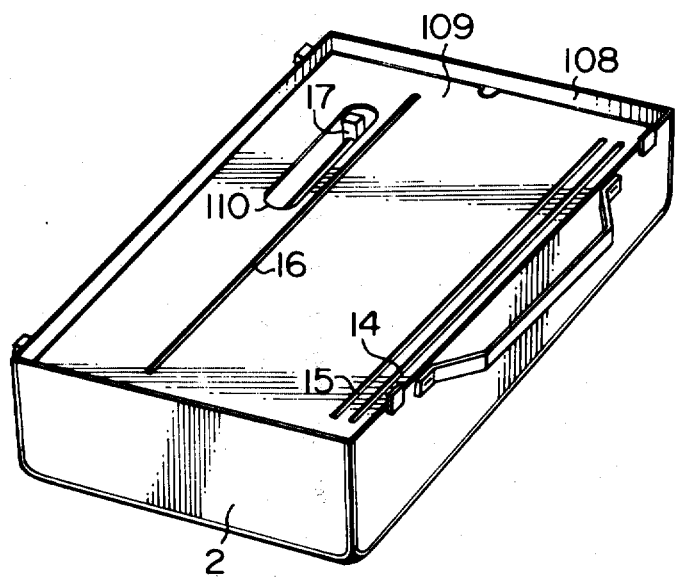
FIG. 13 shows in a perspective view a liquid development unit integrally provided with a photosensitive paper stock box.

FIG. 13 shows an embodiment of the development unit which is integrally formed with a stock box for the photosensitive papers.

The frame 108 constituting the stock box can be formed integrally with the outer housing of the development unit 2, while the bottom plate 108 of the stock box is formed by the cover for the development unit 2. The bottom plate 109 is provided with an insertion opening 14 for the photosensitive paper, an opening 15 for the transfer paper, an exit opening 16 and a slot 110 for permitting the control of the valve 17 therethrough. When the development unit 2 is used, the photosensitive papers and (or) transfer papers may be taken out from the stock box and temporarily placed at suitable location. The bottom plate 109 may be simply disposed on the frame 108 or the development unit 2 or alternatively pivotally connected thereto by means of hinges. In any case, the bottom plate 109 should be so constructed that the storage container for developer can be taken out from the development unit 2. Furthermore, the bottom plate 109 may serves as the light shield member. When there is a possibility that the bottom plate 109 may contact with the developer, the bottom plate should be made of a material corrosion proof to the developer.

Although the embodiment of the invention have been described in connection with the silver salt diffusion transfer process, it will be readily appreciated that the invention can be applied to the copying operation through or diazo type process, a stabilized development process or the like. In the case of the diazo type process, the insertion opening for the transfer paper and guide member therefor can be eliminated to thereby simplify the structure of the development unit. The development unit may be additionally provided with a drying fan, motor, pump outer casing or the like components which may be used in common to the exposure unit. The material for individual elements of the exposure and the development units may be of any suitable kind such as metal, plastic or the like, so far as the material has alkaliproof and solution-proof properties in addition to a sufficient mechanical strength required for the entity of the copier.

The term "developer" as herein used in intended to include the liquid developers for the diazo process, silver salt diffusion transfer process, stabilized developing process, electrophotography, photopolymer process or the like and additionally include a fixing liquid, rinsing liquid and cleansing liquid. In a similar sense, the term "developing chamber" is to encompass a fixation chamber and rinsing chamber in addition to the intrinsic developing chamber.

The contact exposure unit according to the invention may be also used for the diazo type process, dual spectrum process and the like. Further, the contact exposure unit according to the invention may, of course, be used for stationary and slit exposure processes.

What we claim is:
1. A portable copier, comprising:
   a. a contact exposure unit including
      1. a first housing part having at one face side thereof a light-pervious exposure contact surface, and ii. exposure means disposed in said first housing part and having a light source for illuminating said exposure contact surface;

b. a liquid development unit including i. a second housing part having an access face side, and ii. liquid development means disposed within said second housing part and comprising a developing chamber and slot means located at said access face side to provide openings for inserting photosensitive and transfer papers into and withdrawing them from said developing chamber;

and c. means for separably connecting said first and second housing parts to each other such that said first and second housing parts, when interconnected, locate said exposure contact surface in face to face relation with said slot means and coact to form a complete outer housing for the copier.

2. A portable copier as set forth in claim 1, wherein said contact exposure unit comprises a light-pervious rigid plate supported by said first housing part and a light-pervious elastic layer supported at one face thereof by said rigid plate, the other face of said layer constituting said exposure contact surface, and the rigid plate/elastic layer combination is arranged such that, when said first and second housing parts are interconnected and closed to complete the copier housing, said exposure contact surfce is spaced from said liquid development means.

3. A portable copier as set forth in claim 1, wherein said liquid development unit comprises a detachably mounted developer storage container, and control means for controlling a flow of a developer, said developing chamber having means for preventing leakage of the developer from said openings and said developer storage container and said developing chamber being connected to each other through said control means.

4. A portable copier as set forth in claim 2, wherein at least one of said rigid plate and elastic layer is a light diffusive member through which light is homogeneously diffused, and between said light diffusive member and said light source is disposed a light transmissive layer having at least one surface thereof provided with reflection media, said reflection media being arranged such that light which is directed from said light source through said transmissive layer is substantially homogeneously distributed over said exposure contact surface.

5. A portable copier as set forth in claim 2, wherein said elastic layer is a composite structure having an elastic layer and a protection layer therefor.

6. A portable copier as set forth in claim 2, wherein said elastic layer is a composite layer having an elastic layer and a slip preventing layer for photosensitive or other papers.

7. A portable copier as set forth in claim 2, wherein said elastic layer contains an ultraviolet ray absorbing material.

8. A portable copier as set forth in claim 3, wherein said means for preventing leakage of said developer comprises developer trap members disposed at the inner sides of said openings, each of said trap members being formed along the periphery of a respective one of said openings.

9. A portable copier as set forth in claim 3, wherein said means for preventing leakage of said developer comprises developer absorbing members disposed in the vicinity of and along said openings.

10. A portable copier as set forth in claim 3, wherein the inner surface of said developing chamber are hydrophobic to the developer.

11. A portable copier as set forth in claim 3, wherein said means for preventing leakage of the developer comprises an openable and closable cover disposed over each said opening.

12. A portable copier as set forth in claim 3, wherein said control means comprises a developer flow passage for permitting the flow of the developer and an air passage having an open end opended downwardly and disposed within said developing chamber, said developer flow passage and said air passage being provided with associated valves which are interlinked to each other, said air passage being adapted to feed air, upon opening of said valves, from said developing chamber to said storage container through said open end so that the developer in said storage container smoothly flows into said developing chamber through said developer flow passage, and to exhaust air in said storage container through said open end when the developer in said developing chamber is returned to said storage container, and further said open end being adapted to be closed when the developer in said developing chamber is at a predetermined level, whereby the developer flowing into said developing chamber is stopped when the developer is at that level, such that the level of the developer in said developing chamber is maintained substantially constant during using of said development unit.

13. A portable copier as set forth in claim 1, wherein said liquid development unit comprises an extensible light shield member which is adapted to be accommodated within said second housing part.

14. A portable copier as set forth in claim 13, wherein said light shield member is adapted to cut off at least light having wavelengths to which the photosensitive paper is sensitive.

15. A portable copier as set forth in claim 1, wherein said copier further comprises a third housing part separably disposed between said first and second housing parts so as to constitute a part of the complete outer housing of the copier, said third housing part being provided with a carrying handle and defining with said exposure contact surface a space for storing photosensitive paper.

16. A portable copier as set forth in claim 1, wherein said contact exposure unit is provided in said first housing part with a space, between said light source and a wall of said first housing part at the other face side thereof which is remote from said exposure contact surface and constitutes a part of the outer surface of the copier, for storing photosensitive papers, said first housing part has an aperture providing access to said space, and a cover member is provided for closing said aperture, said cover member when in its aperture closing position constituting a part of the outer housing of the copier.

17. A portable copier as set forth in claim 1, wherein said liquid development unit is provided with a space in said second housing part for storing photosensitive papers.

18. A portable copier as set forth in claim 1, wherein said contact exposure unit is provided, at a wall of said first housing part at the other face side thereof which is remote from said exposure contact surface and constitutes a part of the outer surface of the copier, with a retractable handle for pressing said exposure contact surface against an image bearing medium.

19. A portable copier as set forth in claim 1, wherein said contact exposure unit further comprises photoelectric means arranged in the vicinity of said light source for detecting the light flux of said light source, an integration circuit for integrating the output of said photoelectric means, and means responsive to said integration circuit for deenergizing said light source when the integrated output value exceeds a predetermined threshold value.

20. A portable copier as set forth in claim 19, wherein said contact exposure unit further comprises means connected with said integration circuit for varying said predetermined threshold value.

* * * * *